May 12, 1964 H. J. STACEY 3,132,668
DETENT RELEASE FOR FLOW CONTROL VALVES
Filed Feb. 13, 1961 3 Sheets-Sheet 1

FIG I

INVENTOR.
HUGH J. STACEY
BY
Oberlin, Maky & Donnelly
ATTORNEYS

May 12, 1964     H. J. STACEY     3,132,668
DETENT RELEASE FOR FLOW CONTROL VALVES
Filed Feb. 13, 1961     3 Sheets-Sheet 2

INVENTOR.
HUGH J. STACEY
BY
Oberlin, Maky & Donnelly
ATTORNEYS

United States Patent Office 3,132,668
Patented May 12, 1964

3,132,668
DETENT RELEASE FOR FLOW CONTROL VALVES
Hugh J. Stacey, Chesterland, Ohio, assignor to Parker-Hannifin Corporation, Cleveland, Ohio, a corporation of Ohio
Filed Feb. 13, 1961, Ser. No. 88,970
10 Claims. (Cl. 137—624.27)

The present invention relates generally as indicated to a detent release for flow control valves and more particularly to an automatic release mechanism which is fluid actuated.

In the field of hoisting, excavating and like equipment, i.e. cranes, power shovels, hoes, front end loaders, graders, bulldozers, etc., it is a prevalent practice to employ hydraulic cylinders for actuating the booms, buckets, scoops, and like components thereof and to employ banks of flow control valves readily accessible to the operator for controlling actuation of such hydraulic cylinders. It is also common practice to provide such flow control valves with detents so that the valve members may be moved to desired active positions and yieldably held thereat so as to free the operator's hands for performing other operations of the equipment. However, in known control valves having such detent mechanisms, it has been necessary after conclusion of the desired operation for the operator to manually release the thus activated valve member from its detent for return to neutral or inactive position; otherwise, the hydraulic pump continues to operate under great load thereby needlessly consuming power and causing excessive heating and possible foaming of the oil as it is circulated through the hyraulic system under high pressure, and possible damage to packings and other components of the system by the hot foamed oil and sustained high pressure.

Accordingly, it is a principal object of this invention to provide a detent release for a control valve of the character referred to which is operative automatically to release the control valve member from active detent-held position when a desired function thereof has been concluded, or when the movable component of the hydraulic motor encounters an insurmountable obstruction or excessive load, the control valve, when thus released, being spring-returned to neutral or inactive position.

It is another object of this invention to provide a detent release for a flow control valve of the character indicated in which the detent release is actuated by fluid under pressure that is developed between the hydraulic pump and the hydraulic motor actuated thereby, the fluid pressure in this part of the hydraulic system building up as, for instance, when the movable component of the hydraulic motor reaches the end of its stroke, or encounters some other stop, obstruction, or heavy load resistance to its continued movement.

It is another object of this invention to provide a detent release for a four-way type flow control valve which is operative to release the flow control valve member for spring return movement to neutral position from either of its active positions controlling opposite direction actuation of a double acting fluid motor.

It is another object of this invention to provide a fluid pressure actuated detent release mechanism for a flow control valve of the character indicated in which the said mechanism is actutaed by flow of fluid through a preset relief valve which is exposed to fluid pressure in a service port of the flow control valve and which opens when that fluid pressure exceeds the preset value of the relief valve. When open, the relief valve allows fluid to flow into the detent release mechanism and thereby actuate the latter to a position releasing the valve member detent for movement from active position to neutral position.

It is another object of this invention to provide a four-position flow control valve for a fluid motor in which the movable valve member has a neutral position in which the fluid delivered by the pump is bypassed to a reservoir, a first operating position in which the associated fluid motor is actuated in one direction, a second operating position in which the fluid motor is actuated in the opposite direction, and a float positioin in which the movable component of the fluid motor may be moved at a controlled rate of movement and without cavitation, said flow control valve being characterized in having associated therewith a detent mechanism which yieldably holds the same in said first operating position and in said float position and which provides a yieldable sensory indication of the second operating position when said valve is moved from neutral position to the second operating position. The detent mechanism is further characterized in that the flow control valve member may be shifted beyond the second operating position to the float position by overcoming the yieldable sensory indication of said second operating position.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of a few of the various ways in which the principle of the invention may be employed.

Figure 1:
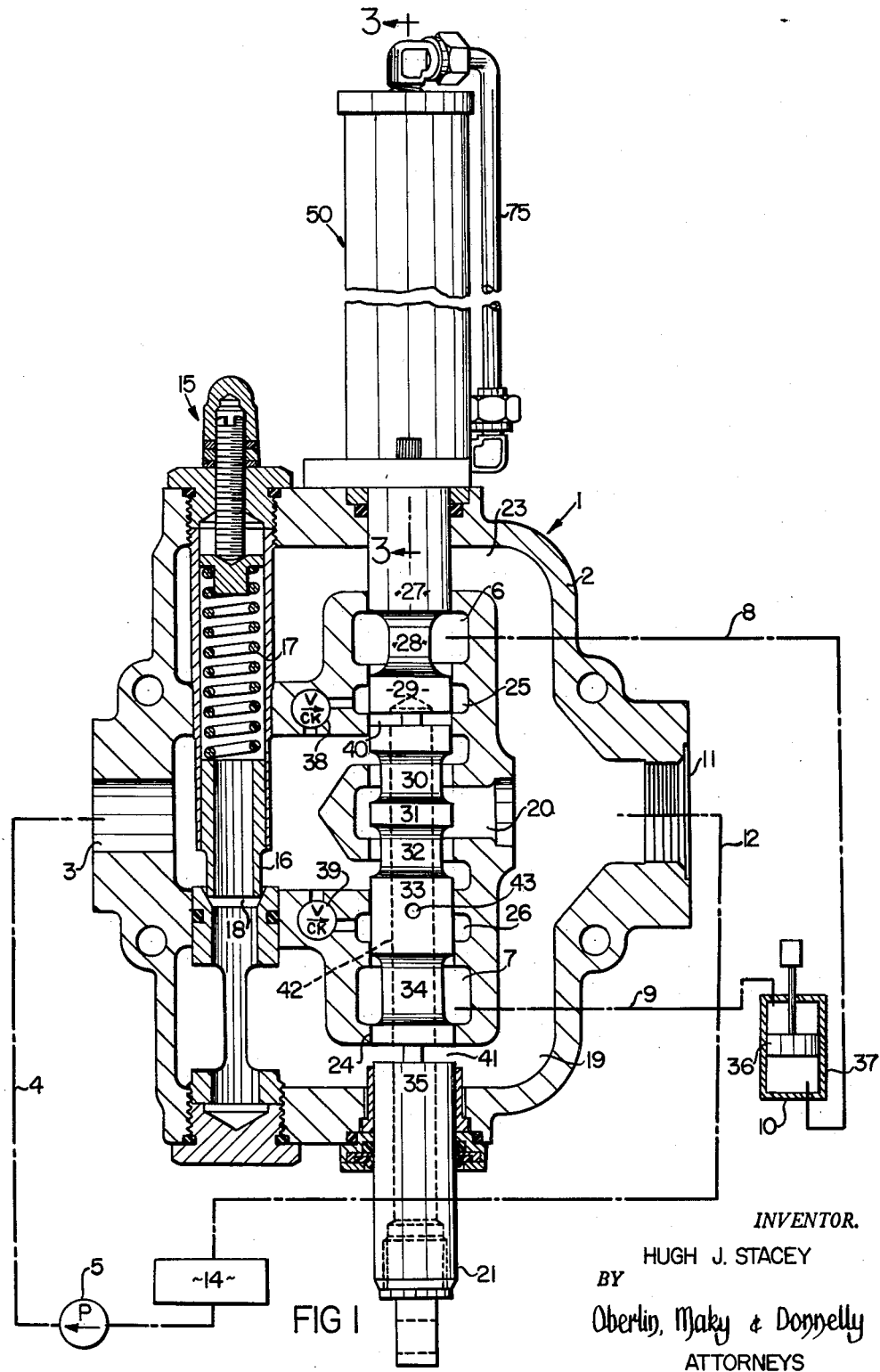
FIG. 1 is an elevation view of the detent and detent release mechanism, the flow control valve being in vertical section through the parallel axes of the valve spool and main relief valve, and the hydraulic system being shown schematically insofar as the double acting fluid motor controlled by the flow control valve, the fluid reservoir, and the hydraulic pump are concerned.
Figure 2:
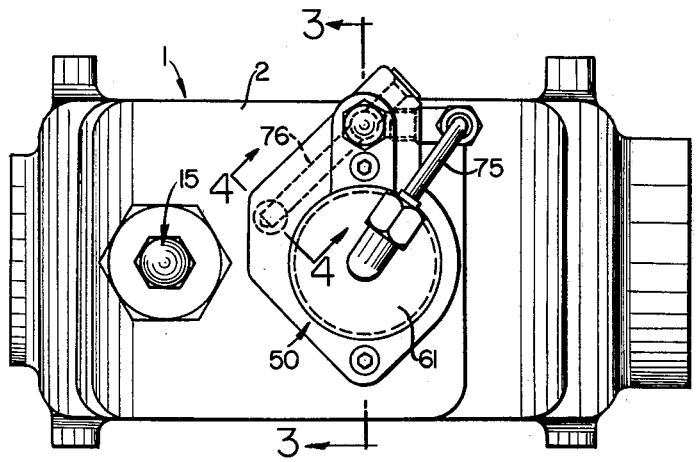
FIG. 2 is a top plan view of the detent and detent release mechanism which is secured to the housing of the flow control valve.
Figure 4:
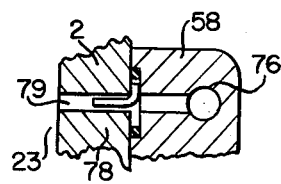
FIG. 4 is an enlarged cross-section view of the detent release bleed orifice taken substantially along line 4—4, FIG. 2.
Figure 3:
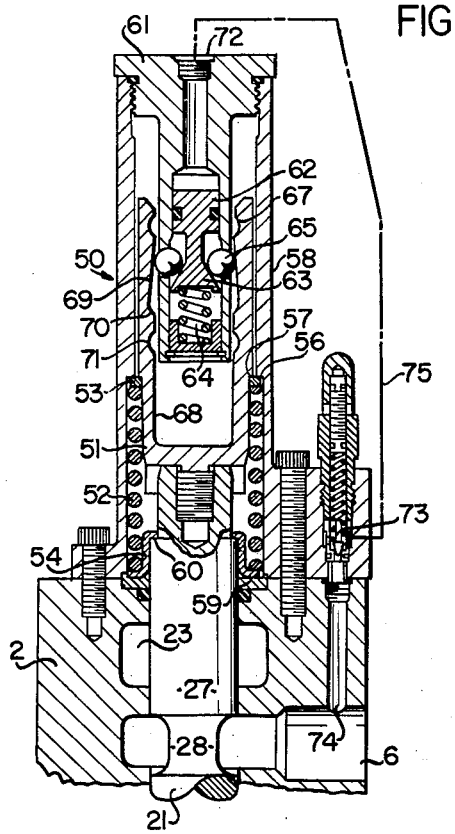
FIG. 3 is an enlarged cross-section view of the detent and detent release mechanism taken substantially along the line 3—3, FIG. 2.

Referring now in detail to the drawings, and first to the embodiment of the invention illustrated in FIGS. 1 to 4, the reference numeral 1 denotes the flow control valve assembly which includes a housing 2 formed with a pressure inlet port 3 adapted to be communicated by way of conduit 4 with the discharge port of a hydraulic pump 5, a pair of service or cylinder ports 6, 7 adapted to be communicated by way of the conduits 8, 9 respectively with the head and rod ends of a double acting hydraulic motor 10, a return port 11 which is adapted to be communicated as by the conduit 12 with the fluid reservoir 14.

Within the housing 1 is a main pressure relief valve assembly 15 which, under normal operating conditions, closes communication between the inlet port 3 and the return port 11 when the system pressure is less than the closing force exerted on the relief valve member 16 by the spring 17. However, if system pressure builds up to a greater value, the relief valve member 16 is forced away from its seat 18 and the fluid discharged by the pump 5 flows from the inlet port 3 to the return port 11 via the return passage 19. The housing 1 is also provided with a bypass passage 20 which, as hereinafter explained, permits free circulation of fluid from the pump 5 to the reservoir 14 whenever the spool valve 21 is in neutral, or inactive position. The housing also has another return passage 23 leading to the return port 11.

Referring now in detail to the spool valve 21, the same is axially reciprocably slidable in the bore 24 formed in the housing 1 and as best shown in FIG. 1, the aforesaid bypass passage 20, pressure feed passages 25, 26, service ports 6, 7, and return passages 23, 19 all intersect the spool bore 24. In turn, the spool 21, as well known in the art is formed with alternate lands and grooves 27 to 35 so arranged that when the spool 21 is in neutral position, as shown in FIG. 1, the fluid delivered by the pump 5 to inlet port 3 flows to the reservoir 14 via the bypass 20 which is opened by the spool lands 29, 31, and 33 for flow of fluid around the intervening spool grooves 30 and 32. In this neutral position of the spool 21, the cylinder ports 6 and 7 are blocked by the respective lands 27, 29 and 33, 35 whereby the piston 36 in the cylinder 37 is held against movement either up or down. If it is desired to raise the piston 36 to hoist a load, to raise a boom, etc., the spool 21 is moved downwardly, whereby the spool lands 29, 31 block the bypass passage 20, the spool lands 27, 29 establish communication over the spool groove 28 between the feed passage 25 and the cylinder port 6 whereby fluid under pressure in the inlet 3 flows through the check valve 38 into the feed passage 25 and therefrom into the head end of the cylinder 37 by way of the conduit 8 thus to move the piston 36 upwardly to lift the load. In this same raised position of the spool 21 communication is established by the spool lands 33, 35 between the other service port 7 and the return passage 19 via spool groove 34 whereby the fluid displaced from the rod end of the cylinder 37 flows through the return passage 19 and return port 11 into the reservoir 14.

When it is desired to move the piston 36 in the cylinder 37 downwardly, the spool 21 is shifted upwardly from the neutral position shown in FIG. 1, whereby the service ports 6, 7 are reversed, that is to say, that fluid under pressure now flows through the check valve 39 into the feed passage 26 and therefrom into the service port 7 and thence by way of the conduit 9 into the rod end of the cylinder 37. In this position of the spool 21, the fluid displaced from the head end of the cylinder 37 is returned to the reservoir via the service port 6 which is communicated with the return passage 23 over the spool groove 28.

The valve herein shown by way of example, has yet another position in addition to the aforesaid piston raise and lower positions, and that is the float position. The float position is that position of the spool valve which is upwardly adjacent the piston lower position and as can be seen, the piston 36 can move down in the cylinder 37 and excess displacement is handled through the hollow spool 21 in the following manner. The cylinder ports 6, 7 are now in fluid communication with each other via the spool slots 40, 41 and spool bore 42. Excess fluid displaced by the head end of the cylinder 37 flows into return port 11 through spool orifice 43 which serves to build up back pressure in the fluid to permit only a gradual descent or "float" of the piston 36.

Secured to the upper end of the valve housing 1 is a detent and detent release assembly 50. The upper end of the spool 21 has screwed thereto a detent body 51 which, together with the spool 21, are held in neutral position as shown in FIG. 1, by means of the spool centering spring 52 which has spring followers 53 and 54 engaged respectively with the shoulders 56 and 57 of the detent housing 58 and detent body 51 and with the shoulders 59 and 60 of the valve housing 2 and spool 21 itself. When the spool 21 is manually shifted downwardly to the "Raise" position, the engagement of the follower 53 with the shoulder 57 will compress the spring 52 whereby, upon release of manual effort, the spring 52 will tend to restore the spool 21 to neutral position. Similarly, when the spool 21 is shifted upwardly to the "Lower" position, the spring follower 54 engaged with the shoulder 60 will be moved upwardly, again compressing the spring 52 and thereby rendering it effective to restore the spool 21 to neutral position upon release of manual effort thereon.

Screwed into the detent housing 58 is a detent carrier 61 which constitutes a cylinder in which the plunger 62 of a detent cam 63 actuated by spring 64 is axially slidable. The detents 65 herein comprise a series of radially outwardly movable balls which are urged radially outwardly by the spring actuated cam 63. Thus, when the spool 21 and detent body 51 are moved downwardly to the "Raise" position whereat the internal groove 67 is aligned with the centers of the detent balls 65, the spring-actuated cam 63 will move in an upward direction thereby to urge the detent balls 65 radially outward into engagement with the groove 67. The force with which the detent balls 65 are held in the groove 67 by the spring actuated cam 63 is greater than the restoring force of the spool centering spring 52 and thus without more, the spool 21 will be frictionally held in the "Raise" position. The spool 21, of course, can be released from this position by upward manual effort thereon and once the balls 65 are disengaged from the groove 67, the spool centering spring 52 will move the spool 21 to neutral position.

In the present example, it is not required to have a detent for the "Lower" position of the spool 21, but it is desired to provide a sensory indication of such "Lower" position and, accordingly, the bore 68 of the detent body 51 has a relatively small taper outwardly and downwardly (at 69) and then an abrupt taper inwardly and downwardly (at 70) so as to provide a definite increase in axial force required on the spool 21 when the balls 65 engage taper 70. However, the slope of the bore portion 69 is so slight that the restoring force of the spool centering spring 52 predominates over the axial component of force exerted by the spring-actuated cam 63 on the detent balls 65, whereby, when the spool 21 is shifted upwardly to the "Lower" position, release of manual effort on the spool 21 permits the latter to be moved automatically to neutral position by the spool centering spring 52.

When it is desired to shift the spool 21 upwardly past the "Lower" position to the float position, the internal groove 71 in the detent body 51 will be aligned with the detent balls 65, whereupon the spring actuated detent cam 63 will urge the balls 65 outwardly into such groove 71 and thereby yieldably retain the spool 21 in the float position despite the restoring influence of the spool centering spring 52.

In order to automatically release the spool 21 for movement from its "Raise" position to its neutral position as when the piston 36 reaches the upper end of its stroke in cylinder 37, or when the piston 36 encounters a great obstruction to its movement, the detent cam 63 is formed as a plunger 62 reciprocable in the cylinder 61 and is so arranged that when fluid under pressure is admitted into the cylinder 61 through the port 72, the detent plunger 62 and cam 63 are forced downwardly against the force of the spring 64, whereby the detent balls 65 are released for inward camming by the groove 67. When that occurs the spool centering spring 52 will be effective to restore the spool 21 to neutral position.

In the present case build up of fluid pressure in the cylinder port 6 is utilized for so actuating the detent cam 63 downwardly. Thus, there is provided in the detent housing 58 a spring-seated detent relief valve 73 which normally closes communication between the cylinder port 6 and the port 72 of the detent cylinder 61. However, when the piston 36 in the cylinder 37 reaches the upper end of its stroke, for example, or when it confronts an obstruction or load of great magnitude, the fluid under pressure will build up between the cylinder port 6 and the head end of the cylinder 37, whereby the relief valve 73 will be unseated to permit flow of fluid into cylinder 61 via the relief inlet passage 74 and the relief outlet passage and conduit 75. Another relief outlet passage 76 leads to return passage 23 via a restricted bleed orifice defined as between the bent wire 78 and passage 79. Thus, fluid pressure will build up in cylinder 61 to force the plunger 62 and cam 63 downwardly to free the detent balls 65 for radial inward movement out of engagement with the groove 67.

Figure 5:
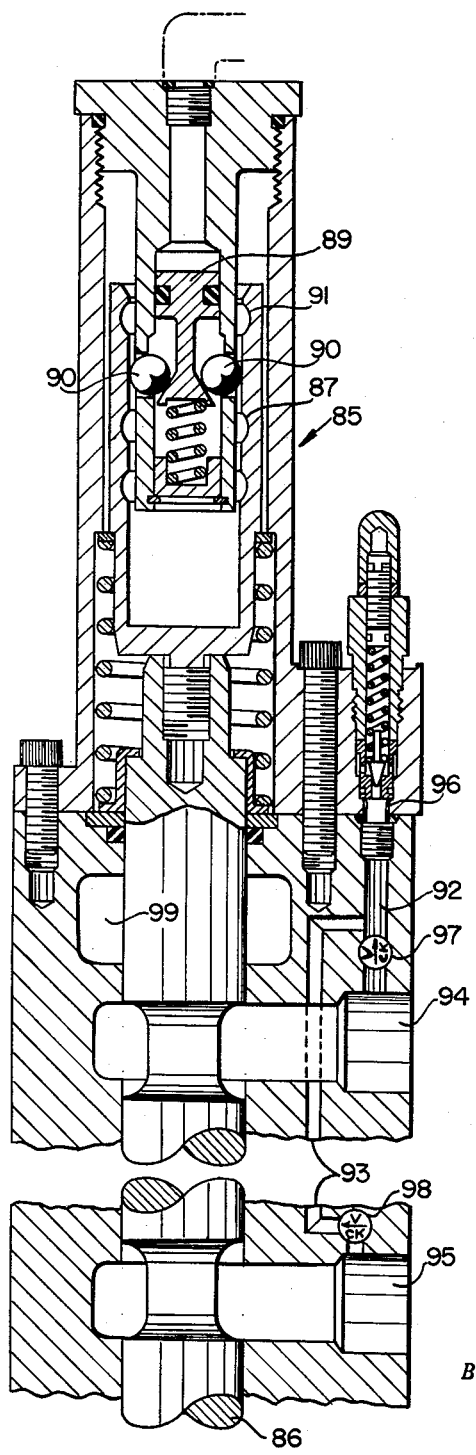
FIG. 5 is a fragmentary cross-section view illustrating a modification in which the flow control valve spool is released from its detent mechanism from either of two operating positions.

Referring now to FG. 5, the detent and detent release mechanism 85 therein shown is much the same as that shown in FIGS. 1 to 4, except that in the FIG. 5 embodiment, it is desired to use the detent mechanism 85 for yieldably holding the spool 86 not only in the "Raise" and "Float" positions, but also in the "Lower" position and, accordingly, there is provided an intermediate "Lower" detent groove 87. In order to enable actuation of the detent cam and plunger 89 to release the detent balls 90 from either the "Raise" groove 91 or "Lower" groove 87, there are provided passages 92 and 93 leading from the respective service ports 94 and 95 to the detent relief valve inlet port 96 and there are installed check valves 97 and 98 in the respective passages 92 and 93 to preclude back flow of fluid into that one of the service ports 94 or 95 which is at that time communicated with the return port 99. Otherwise, the structure of FIG. 5 is the same as that of FIGS. 1 to 4 and, therefore, repetition of the description of the structure and operation is not deemed necessary.

Other modes of applying the principle of the invention may be employed, change being made as regards the details described, provided the features stated in any of the following claims, or the equivalent of such, be employed.

I therefore particularly point out and distinctly claim as my invention:

1. A flow control valve for a fluid motor comprising a housing having a bore intersected axially therealong by an inlet port for fluid under pressure, by a service port for flow of fluid to and from such motor, and by a return port for conducting fluid to a reservoir; a main relief valve in said housing to open fluid communication between said inlet port and said return port when the fluid pressure in said inlet port exceeds a predetermined value at which said main relief valve opens; a spool axially reciprocable in said bore from a first spring-held position whereat fluid communication between said inlet port and said service port is blocked thereby to a second position whereat fluid communication is established between said inlet port and said service port; a detent mechanism including complemental detent-recess means and a spring actuated member operative to yieldably hold said detent-recess means in engagement thereby to hold said spool in said second position in opposition to spring pressure tending to return said spool to said first position; said housing having a passage for conducting fluid under pressure from said service port to act on said member to move it to permit disengagement of said detent-recess means and consequent spring return of said spool to said first position; and another relief valve closing said passage except when the fluid pressure in said service port exceeds a predetermined value at which said another relief valve opens; said housing having bleed means leading from the outfall side of said another relief valve to said return port for decreasing the magnitude of the fluid pressure acting on said member when said another relief valve is open.

2. The flow control valve of claim 1 wherein said member has a plunger portion, and wherein a detent carrier fixedly secured to said housing constitutes a cylinder to which said passage leads and in which said plunger portion is axially moved by fluid under pressure admitted into said cylinder by the opening of said another relief valve.

3. The flow control valve of claim 1 wherein said detent-recess means comprises telescoped tubular members of which one is fixedly secured to said spool and has a recess in its wall and the other of which is fixedly secured to said housing and carries a detent movable radially into and out of engagement with said recess, said detent and recess being aligned when said spool is moved to said second position; and wherein said spring-actuated member is provided with a cam portion holding said detent in engagement wtih said recess, and with a plunger portion acted upon by fluid pressure in said passage when said another relief valve is open to move said spring-actuated member to release said detent for disengagement from said recess and consequent spring return of said spool to said first position.

4. A flow control valve for a double-acting fluid motor comprising a housing having a bore intersected axially therealong by an inlet port for fluid under pressure, by a pair of service ports for flow of fluid to and from a fluid motor, and by a return port for flow of fluid to a reservoir; a main relief valve in said housing to open fluid communication between said inlet port and said return port when the fluid pressure in said inlet port exceeds a predetermined value at which said main relief valve opens; a spool axially reciprocable in said bore from neutral spring-held position whereat fluid communication is blocked between said inlet port and both service ports and is established between said inlet port and said return port to either of two operating positions whereat one service port is in fluid communication with said inlet port and the other service port is in fluid communication with said return port or vice versa; said housing and spool having complemental detent-recess means and a detent actuator effective yieldably to hold said spool in either operating position; said housing having merging passages leading from the respective service ports to said actuator; a check valve in each passage permitting flow of fluid in one direction only from the respective service ports to said actuator; and another relief valve in the merged portion of said passages between said check valves and said actuator to admit fluid under pressure from that one of the service ports that is then in fluid communication with said inlet port to act on said actuator when the magnitude of the fluid pressure is sufficient to open said another relief valve; said housing having bleed means leading from the outfall side of said another relief valve to said return port to decrease the magnitude of the fluid pressure acting on said actuator in relation to that in said one of said service ports and that required to open said another relief valve.

5. A flow control valve for a double-acting fluid motor comprising a housing having a bore intersected axially therealong by an inlet port for fluid under pressure, by a pair of service ports for flow of fluid to and from a fluid motor, and by a return port for flow of fluid to a reservoir; a spool axially reciprocable in said bore from neutral spring-held position whereat fluid communication is blocked between said inlet port and both service ports and is established between said inlet port and said return port to either of two operating positions whereat one service port is in fluid communication with said inlet port and the other service port is in fluid communication with said return port or vice versa; said spool being further axially movable beyond one of said operating positions to a float position whereat said service ports are in fluid communication with each other and wherein said inlet port is in fluid communication with said return port; said housing and spool having complemental detent-recess means and a detent actuator effective yieldably to hold said spool in the other of said operating positions and in said float position and to present a yieldable obstruction to provide a sensory indication of said one of said operating positions as said spool is moved beyond the latter position to said float position; and means for conducting fluid under pressure to act on and move said actuator when said spool is in said other of said operating positions thereby to permit disengagement of said detent-recess means and consequent spring return of said spool to neutral position.

6. The flow control valve of claim 5 wherein said last-named means comprises a relief valve in said housing having its inlet side leading to that one of said service ports which is in fluid communication with said inlet port in said other of said operating positions and having its outfall side leading to said actuator whereby said actuator is moved as aforesaid when the magnitude of the fluid pressure in said one of said service ports is sufficient to open said relief valve.

7. The flow control valve of claim 5 wherein said last-named means comprises a relief valve in said housing having its inlet side leading to that one of said service ports which is in fluid communication with said inlet port in said other of said operating positions and having its outfall side leading to said actuator whereby said actuator is moved as aforesaid when the magnitude of the fluid pressure in said one of said service ports is sufficient to open said relief valve; and wherein said housing has bleed means leading from the outfall side of said relief valve to said return port to decrease the magnitude of the fluid pressure acting on said actuator in relation to that in said one of said service ports and that required to open said relief valve.

8. The flow control valve of claim 5 wherein said detent-recess means comprises telescoped tubular members secured respectively to said housing and spool and one of which has three recesses in the wall thereof and the other of which carries a detent for radial movement by said actuator into engagement with a recess aligned therewith at corresponding operating and float positions of said spool, the middle recess adjoining the recess for the float position having one side thereof at relatively steep slope to provide such sensory indication as aforesaid of said one operating position as the spool is moved therebeyond to float position and having the other side at substantially less slope to permit spring return of said spool to neutral position without fluid pressure actuation of said actuator.

9. The flow control valve of claim 8 wherein said other side of said middle recess extends substantially to the recess corresponding to said other operating position of said spool thereby to minimize the slope, and thus the impediment to spring return of said spool to neutral position from said one operating position.

10. A detent and detent release mechanism for a flow control valve of the type having a housing with an axially reciprocable valve spool spring-held therein in an inactive position, said mechanism comprising telescoped tubular members respectively secured to said spool and to said housing for relative axial movement upon movement of said spool to active positions; one of said members having three recesses axially therealong, and the other of said members having a detent movable radially into and out of engagement with a recess aligned therewith; a detent actuator spring-pressed in one direction to urge said detent into engagement with a recess aligned therewith; and means for conducting fluid under pressure to act on and move said actuator in opposition to spring-pressure thereby to release said detent from at least one recess for spring return of said spool to inactive position; another one of said recesses having one side with wedged engagement with said detent whereby the spring restoring force on said spool is capable of moving said actuator in such opposite direction and consequent movement of said detent axially away from the other side of said another recess.

References Cited in the file of this patent

UNITED STATES PATENTS

| | | |
|---|---|---|
| 2,184,793 | Clench | Dec. 26, 1939 |
| 2,594,664 | Livers et al. | Apr. 29, 1952 |
| 2,800,922 | Charlson | July 30, 1957 |
| 2,844,166 | Edman | July 22, 1958 |
| 2,848,014 | Tennis | Aug. 19, 1958 |
| 2,862,518 | McAlvay | Dec. 2, 1958 |
| 2,874,720 | Vahs | Feb. 24, 1959 |
| 2,985,147 | Rockwell | May 23, 1961 |
| 3,093,158 | Tennis | June 13, 1963 |

FOREIGN PATENTS

| | | |
|---|---|---|
| 725,288 | Great Britain | Mar. 2, 1955 |